Feb. 20, 1962 G. PÄTZOLD ET AL 3,021,967
CONVEYOR SYSTEM WITH STATION SELECTOR
Filed April 26, 1960 9 Sheets-Sheet 4
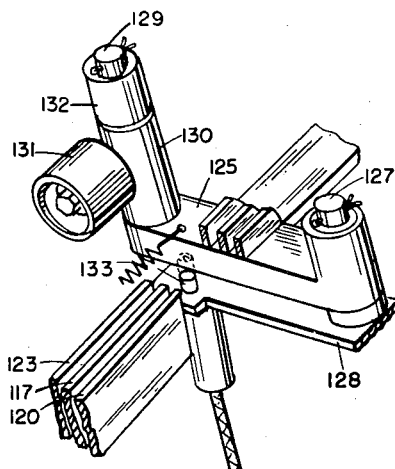
FIG.5
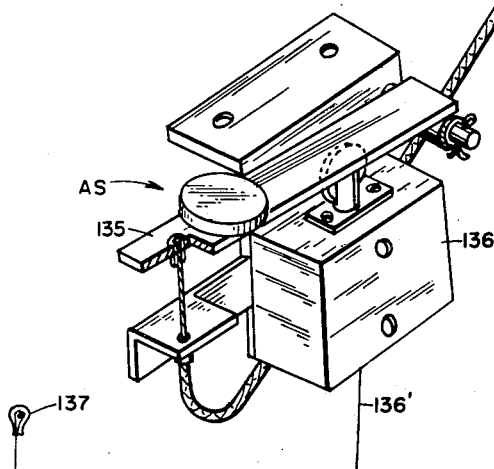
Georg Pätzold
Günter Myska
Erwin Grube
INVENTORS
BY
Karl F. Ross
Agent

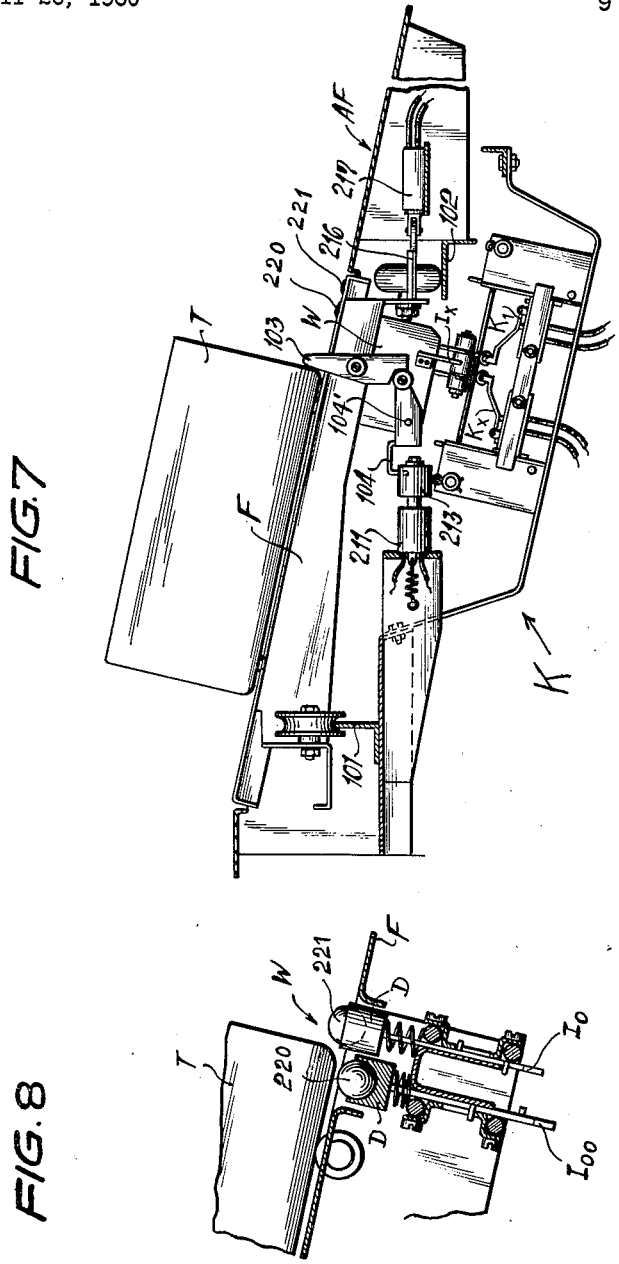

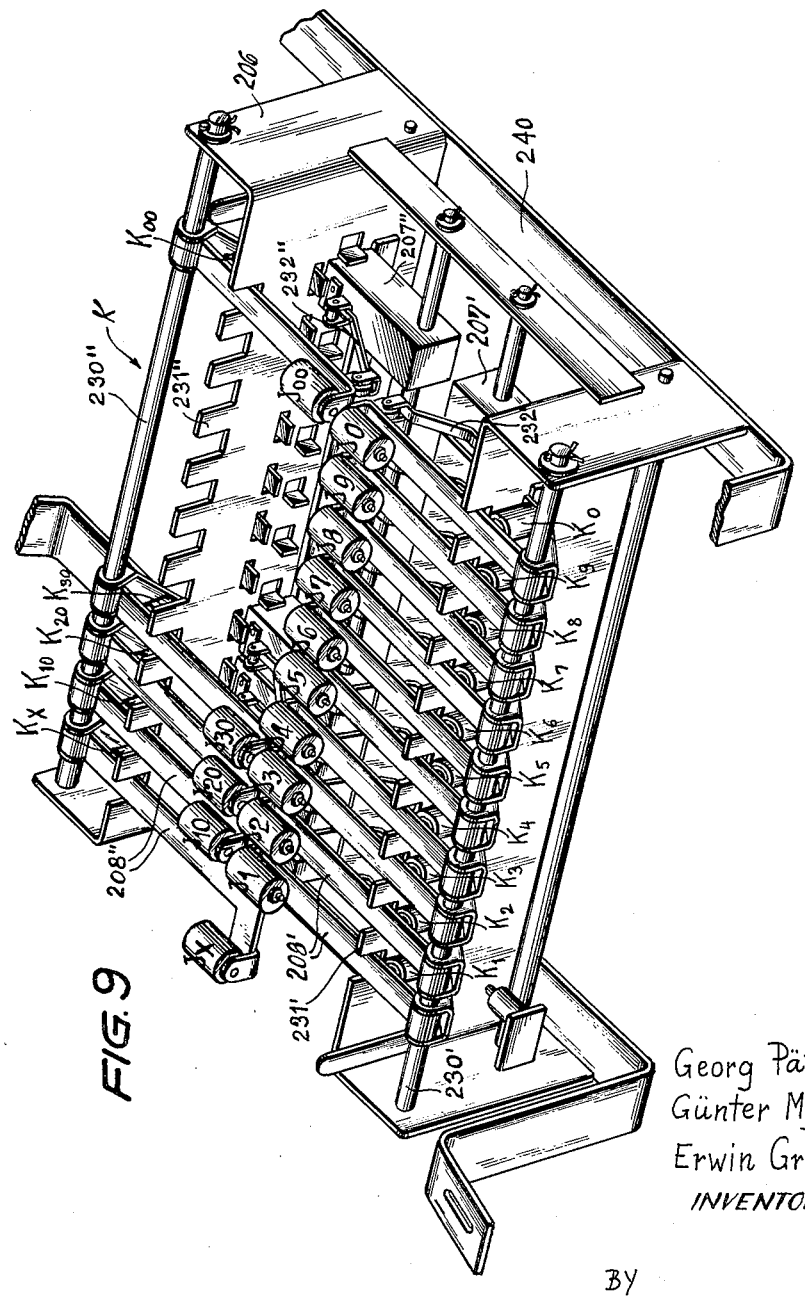

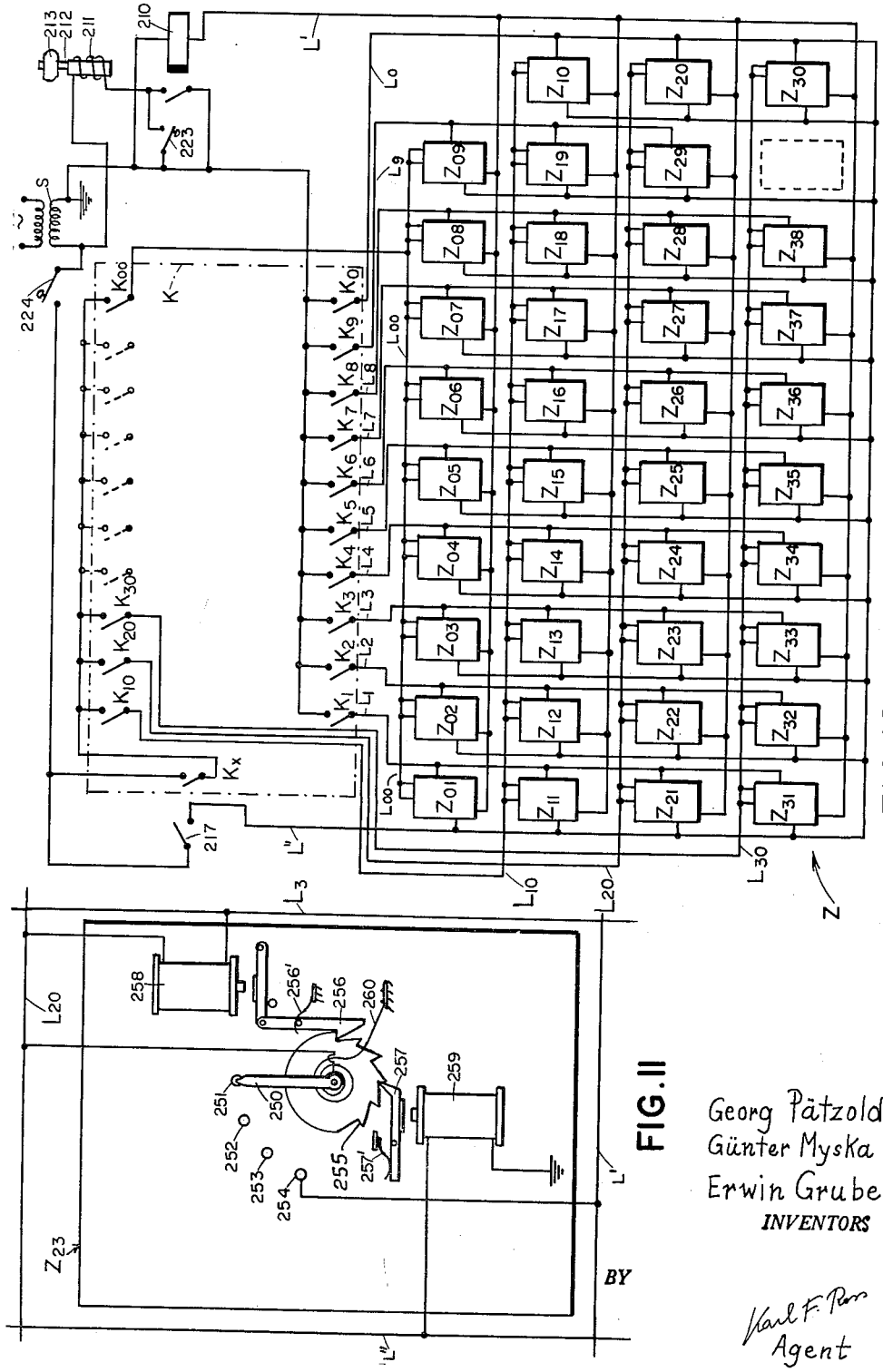

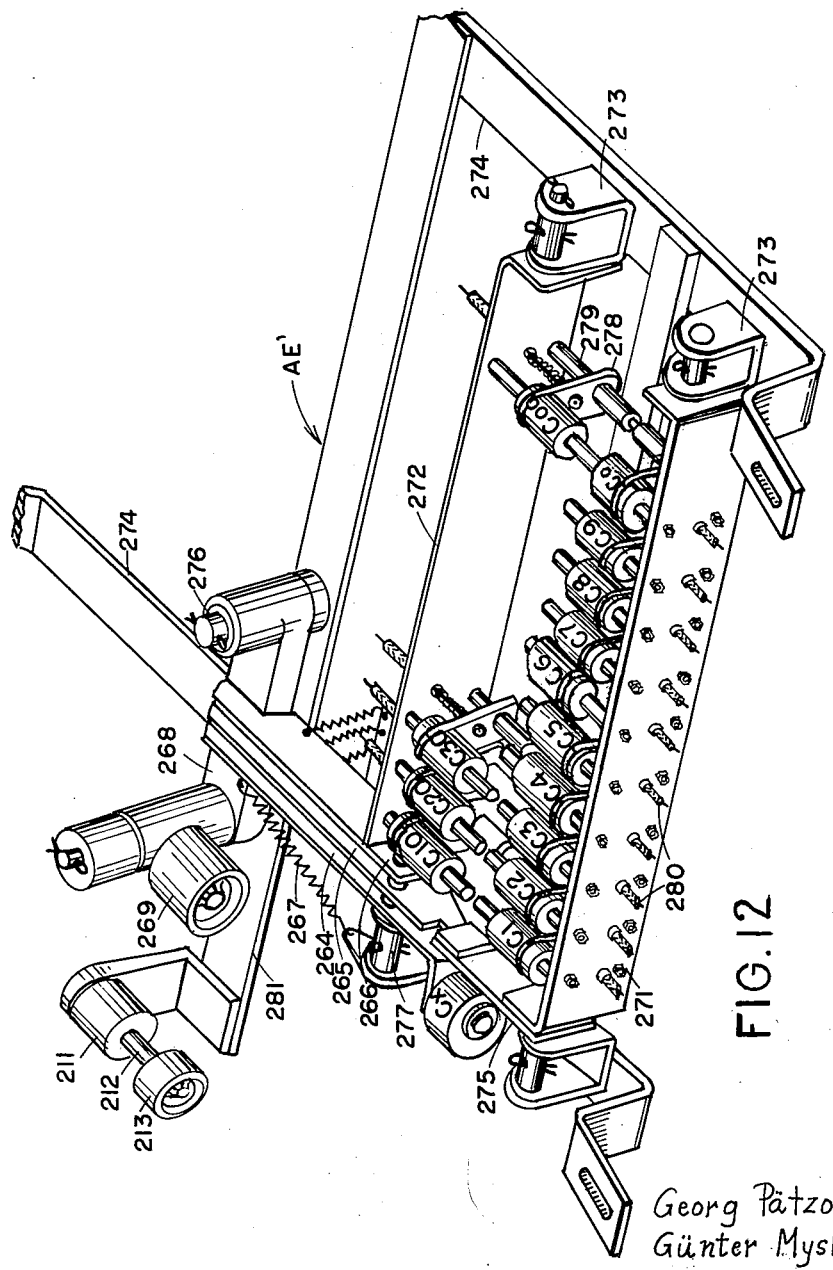

United States Patent Office 3,021,967
Patented Feb. 20, 1962

3,021,967
CONVEYOR SYSTEM WITH STATION SELECTOR
Georg Pätzold, Günter Myska, and Erwin Grube, Bielefeld, Germany, assignors to Durkoppwerke Aktiengesellschaft, Bielefeld, Germany, a corporation of Germany
Filed Apr. 26, 1960, Ser. No. 24,706
20 Claims. (Cl. 214—11)

Our present invention relates to a distributor system in which a plurality of load carriers, entrained by a common conveyor, are provided with selectors which can be preset to indicate any one of several work stations served by the conveyor, the station so indicated being equipped with a correspondingly adjusted controller co-operating with the selector of the carrier to activate, upon ascertaining the existence of a matching pattern, a release mechanism for discharging a load from the carrier onto the station.

In commonly assigned application Ser. No. 857,353, filed December 4, 1959, by Albert Baumann and Erwin Grube, there has been disclosed a distributor system of this type in which the controller at a given station is blocked as long as a load is present on the receiving surface of that station onto which it has been discharged from a passing carrier. In this and similar systems it is convenient to provide, next to the receiving surface, a storage surface to which the load deposited by the carrier may be transferred in order to make room for a second load while the first one is being processed. Thus, each station has a storage capacity of two loads and will accept no further load from the conveyor until at least one of those previously deposited there has been returned to the conveyor for transportation to another work station, e.g. in accordance with a written schedule accompanying each load, or to an unloading station at which it is removed from the system.

Although it is readily possible to apprise a supervisor at a command post, e.g. by means of panel lamps energized by the controller-blocking mechanism, of the fact that certain stations are temporarily unable to receive additional loads, this information will not prevent the dispatching of loads destined for a saturated station from other work stations along the conveyor path. Thus, the distributor system may become overloaded by a large number of continuously circulating articles which, for the reasons indicated, cannot be discharged at the stations for which they are intended.

It is, therefore, the general object of our present invention to provide means for automatically determining the number of separate loads circulating with the same destination through the distributor system during a given phase of its operation, e.g. in the course of a single revolution of the conveyor or some specific fraction of such revolution, whereby supernumerary loads on carriers bearing such destination may be temporarily withdrawn from circulation.

A more specific object of our invention is to provide means for automatically causing such withdrawal of supernumerary loads in response to the operation of a counter which ascertains the number of loads of common destination moving past a given control point within a predetermined interval.

Another object of this invention is to provide means for preventing the actuation of such counter by an empty carrier with the aid of load-controlled swtich or, in the alternative, through the use of a carrier-borne station selector whose code elements, preferably bearing digital designations corresponding to a decimal system, are automatically restored to a neutral position (e.g. 00) upon the discharge of a load from the carrier.

A further object of our invention is to provide means for selectively rendering such a counter responsive only to specific station designations whereby the supervisor may, for example, use the information obtained from the counter for re-routing any carrier destined for certain work stations, which may be temporarily overloaded, to some alternative destination equipped with facilities similar to those of the overloaded station or stations.

In accordance with this invention we provide at a control point, situated in the vicinity of a special sorting station, a reading mechanism responsive to the adjustment of the code selector of a passing carrier bearing any or just certain code designations, this reading mechanism comprising a plurality of testing elements adapted to transmit signals to one or more independent counting devices (e.g. pluse-operated stepping switches) which are permanently assigned to respective work stations or selectively settable to their code designations. The reading mechanism, in scanning the selector of the passing carrier to ascertain its destination, advances the corresponding mounting device by one step. A suitable release mechanism, preferably one similar to those provided at the several work stations, may be operated manually or automatically (e.g. in a terminal position of a counting device) to discharge the load onto the receiving surface of the sorting station whose capacity advantageously is increased by the provision of an auxiliary conveyor. The counters, in accordance with another feature of our invention, may be restored periodically to their starting position, e.g. once or twice during each revolution of the conveyor, in order to initiate a new count at the beginning of each new work cycle.

The above and other objects, features and advantages of our present invention will become more fully apparent from the following detailed description of a preferred embodiment, reference being had to the accompanying drawing in which:

FIG. 5 is a perspective top view of a blocking mechanism associated with the controller of FIGS. 3 and 4;

FIG. 7 is a sectional view similar to FIG. 3, but with a part broken away and taken substantially on the line VII—VII of FIG. 1;

FIG. 8 is a fragmentary sectional view taken substantially on line VIII—VIII of FIG. 6;

FIG. 9 is a perspective top view, similar to FIG. 4, of a reading mechanism embodying the invention and forming part of the system of FIG. 1;

FIG. 10 shows diagrammatically an assembly of counters operatively connected to the reader of FIG. 9;

FIG. 11 is a diagrammatic detail view of one of the counters of FIG. 10;

FIG. 12 is a diagrammatic view of a counter assembly representing a modification of the system of FIG. 10.

Figure 1:
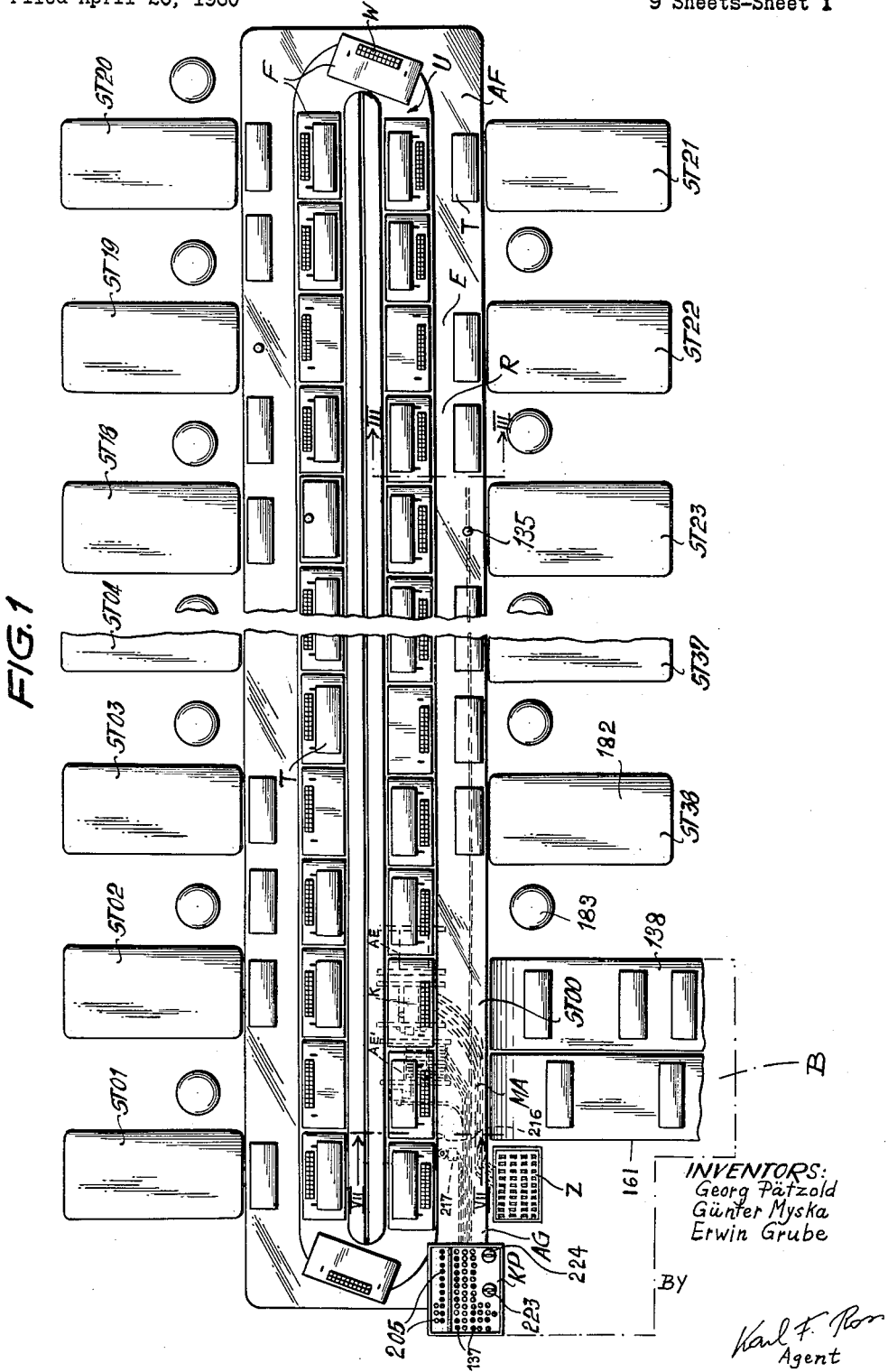
FIG. 1 is a top-plan view of a distributor system according to the invention, generally similar to that disclosed in copending application Ser. No. 857,353 referred to above.

The distributor system shown generally in FIG. 1 comprises a conveyor U which may be an endless chain and has not been illustrated in detail. The conveyor is driven clockwise, by a suitable source of power not shown, and passes in ascending order a number of work stations designated ST01 through ST38, a receiving station ST00 for goods returned from the work stations, and a sorting station MA serving for the temporary withdrawal of supernumerary loads from the conveyor. As will be understood from the ensuing description, the system could readily be expanded to include up to ninety-nine work stations in addition to the receiving station. At AG there is shown a dispatching area for reloading the conveyor; the loads T may be containers for unfinished or semifinished articles (e.g. textiles or leather goods) which are to be successively processed at various work stations before being taken out of circulation at station ST00. Stations ST00 and MA as well as area AG form part of a command post B which also includes a control panel KP manned by a supervisor.

Figure 2:
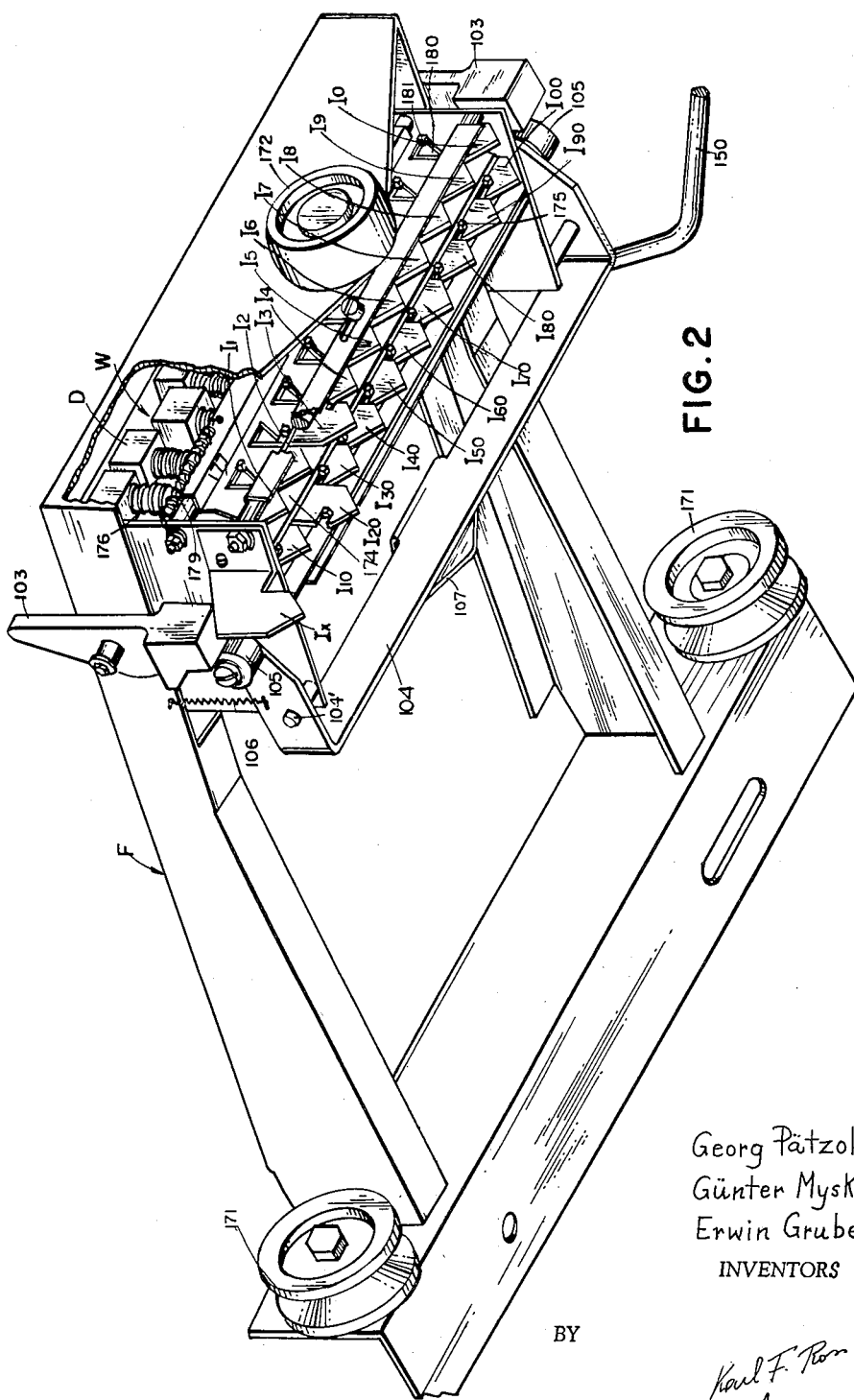
FIG. 2 is a perspective bottom view of a carrier forming part of the system of FIG. 1.
Figure 3:
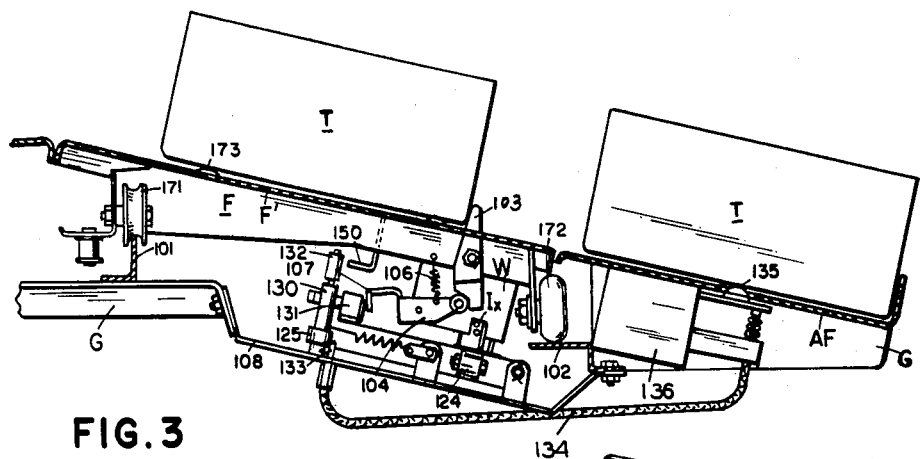
FIG. 3 is a sectional elevation taken on line III—III of FIG. 1, showing the carrier of FIG. 2 positioned above a work-station controller.

A shelf AF, common to all the stations, extends completely around the conveyor path. The sloping surface of this shelf is divided at each work station into a receiving section E and a reloading section R. The length of each of these sections in the direction of conveyor movement corresponds to that of a carrier F whose load-supporting surface F' is co-planar with that of shelf AF, as best seen in FIGS. 3 and 7, this shelf being supported by the base G of the machine. Rails 101 and 102, secured to base G, are respectively engaged by a pair of rollers 171 and a single roller 172 on each carrier F. A pair of detent levers 103, whose weighted lower extremities tend to keep them in an erect position, are pivotally secured to the frame of the carrier F and project upwardly above its surface F' through slots long enough to permit a retraction of their projecting ends by rotation in either direction. These levers are freely swingable in a counterclockwise sense (as viewed in FIGS. 2 and 3) in order to permit a load to be pushed past them from shelf AF onto bearing surface F', but are normally latched against clockwise rotation by a bail 104 which is pivoted to the carrier frame at 104'. Rollers 173 on the carrier F facilitate the movement of the load T over its sloping surface F'.

Each carrier F is provided with an individual selector W whose construction corresponds to that described and illustrated in the aforementioned application by Baumann and Grube. It comprises twenty pushbuttons D arrayed in two parallel rows, these pushbuttons having rigidly depending therefrom respective slides which have been designated $I_1$ to $I_0$ for the units row $I_{10}$ to $I_{00}$ for the tens row. These slides, representing respective selector elements, are provided at their lower extremities with camming edges whose function will presently become apparent. Each pushbutton D bears at the top a legend (see FIG. 6) corresponding to the subscript of its respective camming slide.

The two rows of camming slides $I_1$ to $I_0$ and $I_{10}$ to $I_{00}$ are disposed on opposite sides of a fixed channel member 174, of inverted-U section, whose flanges serve as abutments against which lugs 175 on the slides are normally urged from below by restoring springs 176. Two lock-out bars 177, of which only the one co-operating with the units slides $I_1$ to $I_0$ is visible in FIG. 2, are horizontally slidable on supporting rods 178 and are urged toward the left by springs 179. Each bar 177 is formed with ten windows 180 which are penetrated by further lugs 181 on the associated slides and form generally triangular projections whose lower horizontal edges, as particularly illustrated for the slide $I_3$, are engageable by the lugs 181 when the slides are depressed. Actuation of any pushbutton D in either row will cause its lug 181 to cam the lock-out bar 177 to the right, thereby releasing any slide previously lowered in the same row and preventing the retention of more than one button per row in its depressed position. The selector W illustrated in FIGS. 2 and 6 will be seen to register the digital code "23," its slides $I_3$ and $I_{20}$ having been depressed; it is to be understood that each code consists of two digits, including the "00" digit for the first nine stations ST01 through ST09 and the "0" digit for the decadic stations ST10, ST20 etc.

The bail 104, which is urged in a counterclockwise sense (as viewed in FIGS. 2, 3 and 7) about its pivots 104' by a spring 106, carries an operating cam 107 which is lifted by the controller AE (FIG. 4) of a work station whose setting corresponds to that of the selector W. The carrier F further comprises, as part of its selector, a stationary camming lug $I_X$ at its leading edge and a controller-restoring arm 150 at its trailing edge.

Figure 4:
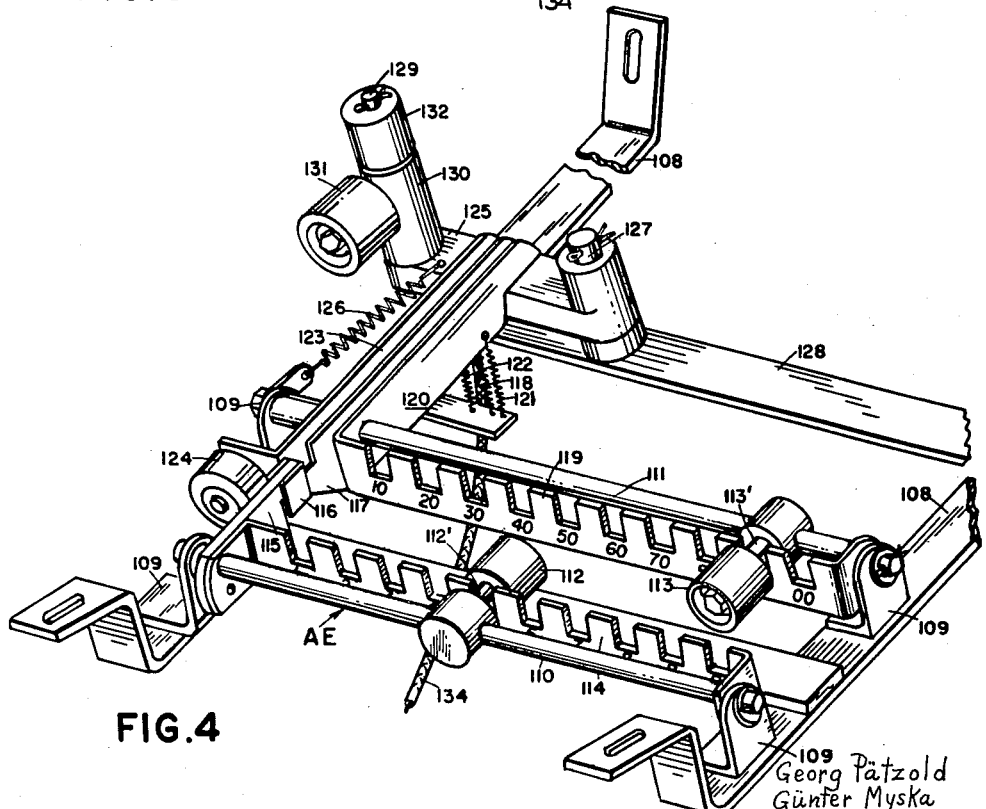
FIG. 4 is a perspective top view of a controller as shown in FIG. 3.

A controller AE, as shown in FIG. 4, is provided at the approach of each of the work stations ST01 to ST38 and, as indicated in dotted lines in FIG. 1, of the unloading station ST00. It is supported by two beams 108, carried by the base G, on which there are mounted by means of brackets 109 two parallel rods 110, 111 serving as pivotal axes for the shafts 112', 113' of a pair of cam rollers 112, 113 acting as testing elements. Also pivoted on these rods are two crenellated indexing bars or racks 114 and 119, respectively, whose indentations are selectively engageable by the respective roller shafts 112', 113'. Each of rollers 112 and 113, when tilted upwardly and out of engagement with its associated indexing bar, can be slid along its rod 110 or 111 into ten longitudinally spaced positions each aligned with a respective indentation. With the particular adjustment shown in FIG. 4, the settings of units roller 112 and tens roller 113 represent the code number "95"; it will be seen that this number does not correspond to that of any station actually provided in the system of FIG. 1 but is merely illustrative of one of one-hundred different adjustments possible.

The indexing bar 114 is rigid with a short lever 115 bearing a fork 116 which acts upon an extremity of a latch arm 117 swingable about rod 111. Another latch arm 120 is integral with indexing bar 119 and extends parallel to arm 117. A third such arm 123, parallel to the other two, is also swingable about rod 111 and carries a further cam roller 124 which is transversely offset from both the units roller 112 and the tens roller 113. More particularly, roller 124 lies in the path of the camming lug $I_X$ of the selector W whereas rollers 112 and 113 are respectively aligned with the units slides $I_1$ to $I_0$ and the tens slides $I_{10}$ to $I_{00}$ of the selector.

The three latch arms 117, 120 and 123, respectively controlled by units roller 112, tens roller 113 and reference roller 124, have aligned extremities undercut to bear upon a release arm 125 under tension from respective springs 118, 121 and 122. Arm 125 is urged counterclockwise about its pivot 127, which rises from a bridge 128 spanning the beams 108, but is normally prevented from so moving by the latch arms 117, 120 and 123. Release arm 125 fixedly supports a boss 130 on which a horizontal trip roller 131 and a vertical roller 132 are rotatably journaled, the shaft of roller 132 having been indicated at 129. When all three latch arms are lifted simultaneously off the release arm 125, an action which will occur only upon the concurrent depression of all three cam rollers 112, 113 and 124 by respective camming elements (lug $I_X$ and, in this case, slides $I_5$ and $I_{90}$) of the selector, arm 125 is swung by spring 126 into a position in which roller 131 lies in the path of the bail lifter 107 so that, as the carrier F passes above the controller AE, its bail 104 is rotated clockwise (e.g. as viewed in FIG. 3) to release the detent levers 103 and to permit a downward sliding of the load T onto the shelf AF. Since, however, the slides $I_3$, $I_{20}$ actually depressed in the selector W of FIG. 2 do not occupy the same position relative to lug $I_X$ as do the rollers 112, 113 of the controller AE with respect to roller 124, the selector would not be capable of initiating the release of the associated detent levers by the concurrent displacement of the three test rollers 112, 113, 124 of the controller.

After the controller AE of a station has tested the camming elements of a matchingly adjusted selector and its latch arms have been actuated thereby to liberate the release arm 125, this action having been followed by the disengagement of the detent levers 103 by the bail 104, the arm 150 associated with this selector bears glancingly upon the roller 132 to restore the arm 125 to its normal position illustrated in FIG. 4. In this position the arm is immediately re-engaged by the latch members 117, 120 and 123 whose associated rollers have meanwhile passed from under the co-operating camming elements of the selector.

As seen in FIG. 5, the bridge 128 is penetrated by a stop pin 133 which is normally below the level of arm 125 and is therefore cleared by this arm when the latter is swung about its pivot 127 under the conditions previously described. The pin 133 may, however, be raised into an elevated position (shown in dot-dash lines) in which it blocks the movement of arm 125, this displacement being brought about by a key 135 which is present on the receiving surface E of the associated station and is connected with pin 133 through a suitable transmission element such as a Bowden wire 134. Key 135 is adapted to be depressed whenever a load T alights on its receiving surface E, thereby preventing actuation of the controller AE to discharge another load onto the same surface. Key 135 also co-operates with a switch 136 to energize, via a wire 136′, a corresponding indicator lamp 137 on panel KP.

As will be seen from FIG. 1, each station ST01 to ST38 is equipped with a work table 182 and a stool 183 respectively facing the receiving section E and the reloading section R of shelf AF. At stations ST00 and MA, however, these work tables are advantageously replaced by outgoing conveyors 138, 161 adapted to remove the oncoming loads as fast as they are discharged from the main conveyor U.

A manual discharge device AE′, similar to the several controllers AE, is positioned below the conveyor U at its approach of sorting station MA. The device AE′, illustrated in detail in FIG. 12, is similar to the so designated manual controller of the aforementioned Baumann-Grube application, except that its adjustability is limited to forty code designations ranging from zero to thirty-nine. This device comprises two banks of axially slidable rollers $C_1$ through $C_0$ (units) and $C_{10}$, $C_{20}$, $C_{30}$, $C_{00}$ (tens) whose shafts are fixedly positioned in a pair of swingable bars 271 and 272. Bar 271, journaled like bar 272 in brackets 273 carried by beams 274, is rigid with a short lever 275 which engages an extremity of a latch arm 265; another latch arm 266 is integral with bar 272. A third latch arm 264 bears a reference roller $C_x$. The three spring-biased latch arms 264, 265, 266 normally prevent the rotation of a release arm 268 about its pivot 276 under the action of a spring 267, in the manner described for the latch arms 117, 120, 123 of FIG. 4; when all three arms are swung simultaneously about their common pivotal shaft 277 by the concurrent depression of associated rollers, release arm 268 operates in the same manner as arm 125 (FIG. 4) to align its trip roller 269 with the lifting cam 107 of the bail 104 of an oncoming carrier.

The ten units rollers and the four tens rollers of manual controller AE′ are normally in a withdrawn position adjacent their respective supporting bars 271 and 272. In these withdrawn positions they are out of the path of camming slides $I_1$ to $I_0$ and $I_{10}$ to $I_{00}$ of any selector W. A section of the control panel KP (FIG. 1) has fourteen pushbuttons 205 whereby any two-digit combination, corresponding to one of the code designations for the work stations of the system, can be brought about by the inward displacement of one units roller and one tens roller on its respective shaft. Such displacement, particularly illustrated in FIG. 12 for the rollers $C_6$ and $C_{00}$ to select the digital code combination 06, can be brought about by means of forks 278 which slide on shaft 279 extending parallel to the roller shafts from bars 271 and 272, against the force of springs (not shown) by means of Bowden wires 280 terminating at the pushbuttons 205. It will be understood that these pushbuttons may be provided with suitable lock-out means, e.g. an arrangement similar to that described in connection with buttons D of FIG. 2, to prevent the actuation of more than one pair of buttons at a time.

The frame of the controller AE′ is extended at 281 to mount a solenoid 211 whose armature 212 carries a trip roller 213. This solenoid constitutes an automatic discharge device operating, in a manner more fully described hereinafter with reference to FIG. 10, under the direct control of a multiple counter Z shown in FIG. 1.

Positioned opposite the auxiliary conveyors 138 and 161 of stations ST00 and MA, as indicated in dotted lines in FIG. 1, and below the path of the carriers F, as will be apparent from FIG. 7, is a reader K whose construction is best illustrated in FIG. 9. This reader comprises, on a frame 240, a pair of horizontal rods 230′, 230″ around which there are respectively swingable two groups of arms 208′, 208″. Arms 208′ carry ten units rollers $J_1$ to $J_0$ whereas arms 208″ have mounted thereon a reference roller $J_x$ and four tens rollers $J_{10}$, $J_{20}$, $J_{30}$ and $J_{00}$. These testing rollers, urged upwardly by springs 232′, 232″ bearing upon the arms 208′, 208″, occupy positions respectively aligned with the path of the camming slides $I_1$ to $I_0$, $I_x$, and $I_{10}$ to $I_{00}$, in the same manner as do the rollers 112, 124 and 113 of FIG. 4. The arms 208′ and 208″ are received in crenellations of a pair of racks 231′, 231″ and, when depressed by the action of respective camming slides upon the associated rollers, close corresponding contacts $K_1$ to $K_0$, $K_x$, and $K_{10}$, $K_{20}$, $K_{30}$ and $K_{00}$ mounted on blocks 207′, 207″.

FIG. 10 shows a circuit arrangement in which the units contacts $K_1$ to $K_0$, the tens contacts $K_{10}$ to $K_{00}$ (of which those corresponding to digits 40 to 90 have been indicated only in dotted lines, being redundant in a 38-station system as shown in FIG. 1) and the reference contact $K_x$ are part of a network for the selective energization of an array Z of individual numerical counters $Z_{01}$ to $Z_{38}$. A further counter, corresponding to the missing station ST39, has been indicated in dotted lines; no counter is provided for station ST00 whose load-receiving capacity, owing to the provision of auxiliary conveyor 138, is assumed to be unlimited.

The network of FIG. 10 includes ten units conductors $L_1$ to $L_0$ extending vertically between the columns of counters $Z_{01}$ to $Z_{38}$ from the respective contacts $K_1$ to $K_0$; four tens conductors $L_{10}$, $L_{20}$, $L_{30}$ and $L_{00}$ extending horizontally along the rows of counters and connected to the corresponding contacts $K_{10}$ etc.; a further, branched conductor L′ connected to the grounded terminal of a current source S through the winding of a slow-releasing relay 210 forming part of a load-discharging mechanism AV which further includes the solenoid 211 carrying on its armature 212 the trip roller 213 (see also FIGS. 7 and 12) similar to roller 131; and a branched conductor L″ connected to the high-voltage terminal of source S via a normally open resetting switch 217 and a manually operable circuit breaker 224 on control panel KP (see also FIG. 1). Switch 217 is periodically closed by a timer which comprises a lug 216 (FIGS. 1 and 7) mounted on one of the load carriers F; it is possible, of course, and may be desirable with lengthy conveyors to increase the frequency of operation of switch 217, and thereby to reduce the length of a counting cycle, by equipping more than one carrier F (or adjacent parts of the conveyor chain) with a lug 216.

The operation of the system of FIG. 10 will be described in detail with reference to FIG. 11 which diagrammatically illustrates the construction of any of the counters or array Z, in particular the counter $Z_{23}$. The counter comprises a stepping switch including a contact arm 250 which is rigid with a ratchet wheel 255 and swingable about its axis to sweep a bank of stationary contacts 251, 252, 253 and 254. Contacts 251 to 253 are left unconnected whereas contact 254 is connected to conductor L'; arm 250 is connected to the tens conductor associated with this particular counter, here the conductor $L_{20}$. Connected between this tens conductor and the associated units conductor, here conductor $L_3$, is the winding of an electromagnet 258 whose armature carries a pawl 256 loaded by a spring 256' and cooperating with the teeth of ratchet wheel 255; these teeth are also engaged by a retaining pawl 257 adapted to be retracted, against the force of a spring 257', by an electromagnet 259 which is connected between ground and conductor L".

Figure 6:
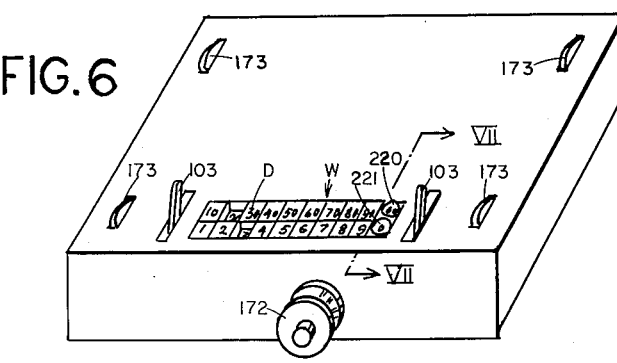
FIG. 6 is a perspective top view of the carrier shown in FIG. 2.

When a carrier destined for station ST23, having its selector W correspondingly adjusted as illustrated in FIGS. 2 and 6, passes the reader K for the first time within a cycle, i.e. after the counting array Z has been reset by closure of switch 217 through lug 216, simultaneous closure of contacts $K_3$, $K_{20}$ and $K_X$ upon a concurrent depression of the corresponding test rollers $J_3$, $J_{20}$ and $J_X$ closes an operating circuit for magnet 258 which may be traced from source S to contact $K_3$, conductor $L_3$, magnet 258, conductor $L_{20}$, contact $K_{20}$, contact $K_X$ and back to source S via circuit breaker 224 (assumed to be closed). The momentary energization of magnet 258 briefly attracts its pawl 256 which advances the ratchet wheel 255 by one tooth, thus causing arm 250 to come to rest on bank contact 252 as the return of the ratchet by the action of its restoring spring 260 is prevented by the pawl 257 dropping behind another of its teeth. If a further carrier F, bearing the same destination, passes the reader K before switch 217 has again been operated, arm 250 advances in like manner onto contact 253. If a third such carrier effects a further energization of magnet 258, arm 250 momentarily touches the contact 254 and closes a circuit for the operation of slow-releasing relay 210 from ground via the winding of this relay, conductor L', contact 254, arm 250, conductor $L_{20}$, contact $K_{20}$ and contact $K_X$ to the live terminal of source S. Relay 210 thereupon attracts its armature and closes an obvious circuit for the operation of solenoid 211. This action places the trip roller 213 in the path of bail 104, as illustrated in FIG. 7, and causes the discharge of the load T onto the conveyor 161 of station MA in essentially the manner previously described.

It will be noted that retaining pawl 257 does not engage a new tooth upon the arm 250 reaching its contact 254, hence the spring 260 will return this arm to contact 253 as soon as the impulse energizing the magnet 258 has passed. If, thereafter, an additional carrier destined for station ST23 passes the reader K, the same sequence of operations will be repeated so that its load will likewise be discharged onto the conveyor 161.

After the main conveyor U has completed a revolution, lug 216 operates switch 217 to close a circuit for magnet 259 extending from ground through the winding of this magnet, conductor L" and switch 217 to potential at source S. This withdraws the pawl 257 from its engagement with ratchet wheel 255 and enables the spring 260 to restore the counter to its starting position shown in FIG. 11, with arm 250 coming to rest on its normal contact 251.

In order to prevent the response of the reader K and of the counting array Z to selectors of empty carriers, we prefer to provide two of the pushbuttons D of these selectors, respectively associated with the slides $I_{00}$ and $I_0$, with rounded heads 220, 221 which normally project above the carrier surface F' and, as best seen in FIG. 8, are adapted to be depressed by the load T as the latter is discharged at the intended work station or at the sorting station MA. Since the actuation of any pushbutton D restores the remaining pushbuttons of the same row as has previously been described, this operation by the load T resets the selector W to a pattern representing the unloading station ST00 to which the counters do not respond.

The circuit breaker 224 may be opened to inactivate the discharge mechanism at station MA whenever traffic is light or the withdrawal of supernumerary loads from circulation is not desired for any reason.

The counters of the array Z may also be designed to afford visual inspection of the positions of their arms 250 so that the supervisor will be enabled, in accordance with the information obtained therefrom, to eliminate supernumerary loads at sorting station MA either with the aid of a switch 223 (see also FIG. 1), which when closed maintains the solenoid 211 energized to cause the successive discharge of all oncoming loads, or by means of the selector buttons 205 to cause the emptying of carriers bearing particular destination-indicating code combinations. A counting system particularly adapted to such visual inspection is illustrated in FIG. 13.

Figure 13:
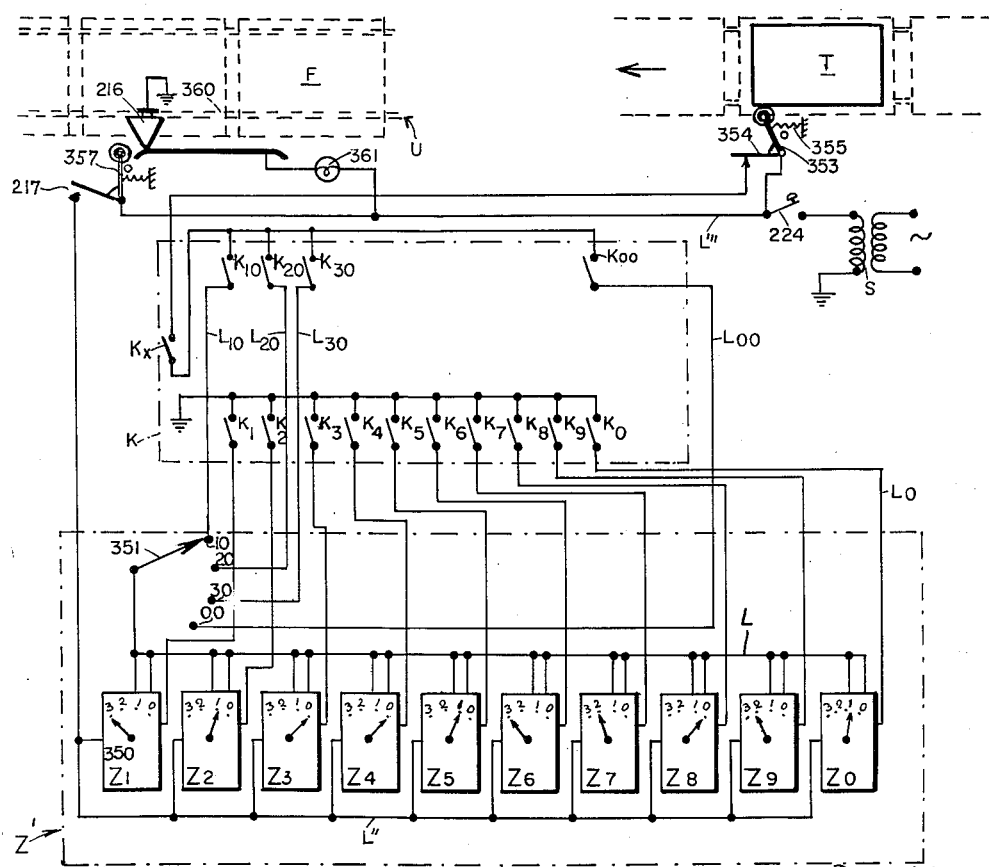
FIG. 13 is a perspective view, similar to FIGS. 4 and 9, of a manually operable discharge device for supernumerary loads.

The modified array Z' of FIG. 13 comprises only one row of ten individual counters labeled $Z_1$ through $Z_0$. Each of these counters has an internal construction similar to that shown in FIG. 11, except for the omission of the outgoing lead from contact 254 and the provision of an added tooth on ratchet 255 to arrest the counter in a position corresponding to alignment of this contact with arm 250. The shaft of this arm carries a pointer 350 which thus can occupy either a normal position (0) or any one of three off-normal positions (1, 2, 3). It will be apparent that the number of such positions may readily be extended by a corresponding increase in the number of ratchet teeth.

The conductors emerging from each of the counters of array Z' are connected, in a manner analogous to that shown in FIGS. 10 and 11, to two horizontal bus bars, L, L" and respective vertical leads $L_1$ to $L_0$. Bus bar L is connected to a wiper 351 of a selector switch affording a choice among the first four decades of the decimal system whereby the counting array Z' can be made to respond to code designations identifying work stations from the group ST00 to ST09, ST10 to ST19, ST20 to ST29, and ST30 to ST38. Thus, the wiper 351 is provided with four bank contacts respectively marked 10, 20, 30, 00 and connected to leads $L_{10}$, $L_{20}$, $L_{30}$, $L_{00}$ from the correspondingly designated contacts of reader K.

The energization of the stepping magnets 258 of the counters $Z_1$ to $Z_0$ occurs in essentially the aforedescribed manner from source S over manually operable circuit breaker 224 (assumed to be closed), a load-operated contact 354 reference contact $K_X$ of reader K, one of the tens contacts (e.g. $K_{10}$) of the reader, corresponding bank contact (10) and wiper 351, bus bar L, magnet 258 (FIG. 11) of a counter (e.g. $Z_1$), corresponding vertical lead ($L_1$) and units contact ($K_1$) of reader K to ground. Contact 354 is rigid with an arm 353 which bears a roller contacting the load T of a passing carrier so as to maintain the contact closed, against the force of a spring 355, while the reader K tests the selector W of that carrier; if no load is present, the counters will not be advanced even if the selector setting is within the decade to which the array Z' has been preset by the wiper 351.

Contact 217, whose closure serves for the periodic energization of restoring magnets 259 (FIG. 11) via bus bar L", a conductor L'" and contact 224 to reset the counters to zero as previously described, is shown rigid with an arm 357 which is tensioned by a spring 358 normally keeping this contact open. The lug 216, which briefly closes the contact 217 by engaging a roller at the end of arm 257, is here shown grounded and attached to the chain 360 of the conveyor U. A stationary conductor strip 362, advantageously having a length corresponding substantially to that of a carrier F, is connected via a signal lamp 361 to lead L'" so that this lamp will light whenever, with contact 224 closed, lug 216 approaches the contact 217. Thus alerted, the supervisor may "freeze" the position of the counters by opening the contact 224 and, after inspection of their positions, may carry out the previously described operations for the withdrawal of supernumerary loads or for their re-routing through a change in the destination of the corresponding carriers.

The optional re-routing of carriers without withdrawal of their loads has the advantage of avoiding the need for storing such loads at sorting station MA and for subsequently returning them to the conveyor. This provision of load-controlled switch 354 eliminates the need for a selector-resetting mechanism as described in connection with FIG. 8.

It will be apparent that the selective assignment of counters to different groups of stations, as particularly illustrated in FIG. 13, may also be used in an automatic counting array as shown in FIG. 10 and that, conversely, the array Z' of FIG. 13 may be extended in the manner shown for the array Z, with consequent elimination of the selector switch 351. These and other modifications and adaptations will be readily apparent to persons skilled in the art and are intended to be embraced within the spirit and scope of the invention, except as further limited by the appended claims.

We claim:

1. In a distributing system, in combination, a conveyor movable along a closed path, a plurality of load carriers entrained by said conveyor, detent means on each of said carriers adapted to hold a load thereon, a plurality of work stations adjacent said conveyor each provided with a controller in the path of said carriers set in a station-identifying pattern, a code selector on each of said carriers adjustable to a plurality of patterns respectively identifying said work stations by matching the patterns of their controllers, release means at said controllers engageable with said detent means during passage of a carrier bearing a matchingly adjusted selector for tripping said detent means into a load-releasing position, a sorting station adjacent said conveyor provided with a reader in the path of said carriers, said reader having a plurality of testing elements positioned for temporary displacement by the selectors of passing carriers in a variety of patterns determined by the setting of each selector, a counter assigned to one of said work stations and connected to said reader for operation by said testing elements upon the detection of a corresponding selector pattern, and signal means at said sorting station controlled by said counter for indicating a predetermined number of occurrences of the same pattern.

2. In a distributing system, in combination, a conveyor movable along a closed path, a plurality of load carriers entrained by said conveyor, detent means on each of said carriers adapted to hold a load thereon, a plurality of work stations adjacent said conveyor each provided with a controller in the path of said carriers set in a station-identifying pattern, a code selector on each of said carriers adjustable to a plurality of patterns respectively identifying said work stations by matching the patterns of their controllers, first release means at said controllers engageable with said detent means during passage of a carrier bearing a matchingly adjusted selector for tripping said detent means into a load-releasing position, a sorting station adjacent said conveyor provided with a reader in the path of said carriers, said reader having a plurality of testing elements positioned for temporary displacement by the selectors of passing carriers in a variety of patterns determined by the setting of each selector, a counter assigned to one of said work stations and connected to said reader for operation by said testing elements upon the detection of a corresponding selector pattern, signal means at said sorting station controlled by said counter for indicating the number of recurrences of said corresponding pattern, and second release means at said sorting station operable to trip said detent means into a load-releasing position for discharging onto said sorting station the load of a carrier whose selector bears said corresponding pattern.

3. In a distributing system, in combination, a conveyor movable along a closed path, a plurality of load carriers entrained by said conveyor, detent means on each of said carriers adapted to hold a load thereon, a plurality of work stations adjacent said conveyor each provided with a controller in the path of said carriers set in a station-identifying pattern, a code selector on each of said carriers adjustable to a plurality of patterns respectively identifying said work stations by matching the patterns of their controllers, release means at said controllers engageable with said detent means during passage of a carrier bearing a matchingly adjusted selector for tripping said detent means into a load-releasing position, a sorting station adjacent said conveyor provided with a reader in the path of said carriers, said reader having a plurality of testing elements positioned for temporary displacement by the selectors of passing carriers in a variety of patterns determined by the setting of each selector, a counter assigned to one of said work stations and connected to said reader for operation by said testing elements upon the detection of a corresponding selector pattern, signal means at said sorting station controlled by said counter for indicating a predetermined number of occurrences of the same pattern, and switch means for selectively readjusting said counter to the pattern of at least one other station.

4. In a distributing system, in combination, a conveyor movable along a closed path, a plurality of load carriers entrained by said conveyor, detent means on each of said carriers adapted to hold a load thereon, a plurality of work stations adjacent said conveyor each provided with a controller in the path of said carriers set in a station-identifying pattern, a code selector on each of said carriers adjustable to a plurality of patterns respectively identifying said work stations by matching the patterns of their controllers, release means at said controllers engageable with said detent means during passage of a carrier bearing a matchingly adjusted selector for tripping said detent means into a load-releasing position, a sorting station adjacent said conveyor provided with a reader in the path of said carriers, said reader having a plurality of testing elements positioned for temporary displacement by the selectors of passing carriers in a variety of patterns determined by the setting of each selector, a plurality of counters each assigned to a respective work station and connected to said reader for operation by said testing elements upon the detection of a corresponding selector pattern, and signal means at said sorting station controlled by said counters for indicating a predetermined number of recurrences of the same pattern.

5. In a distributing system, in combination, a conveyor movable along a closed path, a plurality of load carriers entrained by said conveyor, detent means on each of said carriers adapted to hold a load thereon, a plurality of work stations adjacent said conveyor each provided with a controller in the path of said carriers set in a station-identifying pattern, a code selector on each of said carriers adjustable to a plurality of patterns respectively identifying said work stations by matching the patterns of their controllers, first release means at said controllers engageable with said detent means during passage of a carrier bearing a matchingly adjusted selector for tripping said detent means into a load-releasing position, a sorting station adjacent said conveyor provided with a reader in the path of said carriers, said reader having a plurality of testing elements positioned for temporary displacement by the selectors of passing carriers in a variety of patterns determined by the setting of each selector, a plurality of counters each assigned to a respective work station and connected to said reader for operation by said testing elements upon the detection of a corresponding selector pattern, signal means at said sorting station controlled by said counters for indicating a predetermined number of recurrences of the same pattern, and second release means at said sorting station operable to trip said detent means into a load-releasing position for discharging onto said sorting station the load of a carrier whose selector bears the recurring pattern.

6. The combination according to claim 5, further comprising restoring means on each carrier for re-adjusting the associated selector to a neutral position in response to the discharge of a load from said carrier.

7. The combination according to claim 6, further comprising an unloading station adjacent said conveyor provided with a controller matching the pattern of said selectors in the neutral position thereof.

8. The combination according to claim 7 wherein said unloading station is positioned next to said sorting station.

9. In a distributing system, in combination, a conveyor movable along a closed path, a plurality of load carriers entrained by said conveyor, detent means on each of said carriers adapted to hold a load thereon, a plurality of work stations adjacent said conveyor each provided with a controller in the path of said carriers set in a station-identifying pattern, a code selector on each of said carriers adjustable to a plurality of patterns respectively identifying said work stations by matching the patterns of their controllers, release means at said controllers engageable with said detent means during passage of a carrier bearing a matchingly adjusted selector for tripping said detent means into load-releasing position, a sorting station adjacent said conveyor provided with a reader in the path of said carriers, said reader having a plurality of testing elements positioned for temporary displacement by the selectors of passing carriers in a variety of patterns determined by the setting of each selector, a counter assigned to one of said work stations and connected to said reader for operation by said testing elements upon the detection of a corresponding selector pattern, signal means at said sorting station controlled by said counter for indicating a predetermined number of occurrences of the same pattern, and timer means for periodically resetting said counter to a starting position.

10. The combination according to claim 9 wherein said timer means comprises a stationary switch and actuating means for said switch entrained by said conveyor.

11. The combination according to claim 10, further comprising indicator means controlled by said actuating means for signaling the approaching resetting of said counter.

12. In a distributing system, in combination, a conveyor movable along a closed path, a plurality of load carriers entrained by said conveyor, detent means on each of said carriers adapted to hold a load thereon, a plurality of work stations adjacent said conveyor each provided with a controller in the path of said carriers set in a station identifying pattern, a code selector on each of said carrier adjustable to a plurality of patterns respectively identifying said work stations by matching the patterns of their controllers, releasing means at said controllers engageable with said detent means during passage of a carrier bearing a matchingly adjusted selector for tripping said detent means into a load-releasing position, a sorting station adjacent said conveyor provided with a reader in the path of said carriers, said reader having a plurality of testing elements positioned for temporary displacement by the selectors of passing carriers in a variety of patterns determined by the setting of each selector, a counter assigned to one of said work stations and connected to said reader for operation by said testing elements upon the detection of a corresponding selector pattern, signal means at said sorting station controlled by said counter for indicating a predetermined number of occurrences of the same pattern, and operating means for said counter including contact means engageable with a load on a passing carrier for rendering said counter ineffective in the absence of said load.

13. In a distributing system, in combination, a conveyor movable along a closed path, a plurality of load carriers entrained by said conveyor, a plurality of work stations adjacent said conveyor each provided with a receiving surface and with a controller in the path of said carriers set in a station-identifying pattern, a code selector on each of said carriers adjustable to a plurality of patterns respectively identifying said work stations by matching the patterns of their controllers, detent means on each of said carriers adapted to hold a load thereon, first release means at said controllers engageable with said detent means during passage of a carrier bearing a matchingly adjusted selector for tripping said detent means into a load-releasing position, mechanism responsive to the presence of a load on said receiving surface for blocking the operation of said first release means, a sorting station adjacent said conveyor provided with a reader in the path of said carriers, said reader having a plurality of testing elements positioned for temporary displacement by the selectors of passing carriers in a variety of patterns determined by the setting of each selector, a plurality of stepping switches each assigned to a respective work station and connected to said reader for operation by said testing elements upon the detection of a corresponding selector pattern, timer means for repetitively measuring a predetermined interval, second release means at said sorting station operable in a predetermined off-normal position of any of said stepping switches to trip said detent means into a load-releasing position for discharging onto said sorting station the load of a carrier whose selector bears a pattern recurring a pre-determined number of times within said interval, and resetting means controlled by said timer means for restoring said stepping switches to normal at the end of said interval.

14. The combination according to claim 13, further comprising an unloading station adjacent said conveyor and alongside said sorting station, said selectors being adjustable to a special pattern identifying said sorting station, said unloading station being provided with a controller and releasing means controlled thereby for discharging onto said unloading station any load on a passing carrier whose selector bears said special pattern.

15. The combination according to claim 14 wherein said stepping switches are provided with an operating network including conductors and contacts controlled by said testing elements for establishing a circuit for the advance of one of said stepping switches in response to any selector pattern except said special pattern.

16. The combination according to claim 15, further comprising restoring means on each carrier for resetting the associated selector to said special pattern in response to the discharge of a load from said carrier.

17. In a distributing system, in combination, a conveyor, a load carrier entrained by said conveyor, a plurality of work stations adjacent said conveyor each provided with a controller in the path of said carriers set in a station-identifying pattern, a code selector on said carrier adjustable to a plurality of patterns respectively identifying said work stations by matching the patterns of their controllers, mechanism responsive to detection of a matching selector pattern by any of said controllers for discharging a load from said carrier at the corresponding station, and restoring means on said carrier for resetting said selector to a neutral position in response to the discharge of a load from said carrier.

18. The combination according to claim 17 wherein said selector comprises a plurality of pushbuttons set in a row, said carrier having a load-supporting surface, one of said pushbuttons being provided with a curved upper extremity projecting above said surface and adapted to be depressed by contact with a passing load.

19. In a distributing system, in combination, a conveyor, a load carrier entrained by said conveyor, a plurality of work stations each provided with a controller in the path of said carrier, selector means on said carrier including a plurality of individually displaceable code elements arrayed in at least one row extending in the direction of carrier movement, a fixed reference element on said carrier transversely offset from said row, said controller comprising at least two test elements spaced apart in the direction of carrier movement and positioned adjacent the path of said selector means in alignment with said row and said reference element, respectively, for camming displacement by the latter and by any code element of said row displaced into an off-normal position, detent means on said carrier adapted to hold a load thereon, release means at said controller engageable with said detent means during passage of said carrier for tripping said detent means into a load-releasing position, operating means for said release means jointly controlled by said test elements for actuation upon simultaneous camming displacement of said two test elements, and restoring means on said carrier for resetting said selector to a neutral position in response to the discharge of a load from said carrier.

20. In a distributing system, in combination, a conveyor, a load entrained by said conveyor, a plurality of work stations each provided with a controller in the path of said carrier, selector means on said carrier including a plurality of individually displaceable code elements arrayed in a plurality of rows extending in the direction of carrier movement, a fixed reference element on said carrier transversely offset from said rows, said controller comprising at least three test elements spaced apart in the direction of carrier movement and positioned adjacent the path of said selector means in alignment with said rows and said reference element, respectively, for camming displacement by the latter and by any code element of said rows displaced into an off-normal position, detent means on said carrier adapted to hold a load thereon, release means at said controller engageable with said detent means during passage of said carrier for tripping said detent means into a load-releasing position, operating means for said release means jointly controlled by said test elements for actuation upon simultaneous camming displacement of said three test elements, and restoring means on said carrier for resetting said selector to a neutral position in response to the discharge of a load from said carrier.

References Cited in the file of this patent

UNITED STATES PATENTS 2,919,790    Winz _____ Jan. 5, 1960